(12) United States Patent
Clausen et al.

(10) Patent No.: US 10,246,875 B2
(45) Date of Patent: Apr. 2, 2019

(54) MULTIPLE ELEMENT SUPPORT BEAM

(71) Applicant: Haldor Topsøe A/S, Kgs. Lyngby (DK)

(72) Inventors: Peer Thaarup Kjeldgaard Clausen, Humlebæk (DK); Kunal Dinesh Shah, Vesu Surat (IN); Klaus Risbjerg Jarlkov, Hårlev (DK)

(73) Assignee: Haldor Topsoe A/S, Lyngby (DK)

( * ) Notice: Subject to any disclaimer, the term of this patent is extended or adjusted under 35 U.S.C. 154(b) by 96 days.

(21) Appl. No.: 15/127,272

(22) PCT Filed: May 22, 2015

(86) PCT No.: PCT/EP2015/061392
§ 371 (c)(1),
(2) Date: Sep. 19, 2016

(87) PCT Pub. No.: WO2015/177342
PCT Pub. Date: Nov. 26, 2015

(65) Prior Publication Data
US 2018/0094433 A1    Apr. 5, 2018

(30) Foreign Application Priority Data

May 23, 2014  (IN) ........................... 1370/DEL/2014
Nov. 27, 2014  (DK) ............................... 2014 00687

(51) Int. Cl.
*B01J 8/02* (2006.01)
*E04B 7/04* (2006.01)
(Continued)

(52) U.S. Cl.
CPC ............ *E04B 7/045* (2013.01); *B01J 8/0242* (2013.01); *B01J 19/305* (2013.01); *E04B 1/28* (2013.01);
(Continued)

(58) Field of Classification Search
CPC ... E04B 7/045; E04B 1/28; E04C 3/28; E04C 3/29; E04C 3/07; B65D 90/12;
(Continued)

(56) References Cited

U.S. PATENT DOCUMENTS 1,204,955 A * 12/1916 Day ........................... B01J 8/44
                                                422/221
2,505,851 A *  5/1950 Wobker ...................... B01J 8/44
                                                422/221
(Continued)

FOREIGN PATENT DOCUMENTS

DE        656192 C   *  1/1938 ............. B65D 90/12
DE    29 45 087 A1      5/1981
(Continued)

*Primary Examiner* — Joshua J Michener
*Assistant Examiner* — Matthew J Gitlin
(74) *Attorney, Agent, or Firm* — Blank Rome LLP

(57) ABSTRACT

The present application relates to a vessel support beam comprising two or more beam elements wherein each beam element comprises a first and second opposing long side connected by a top side, a lower side and two opposing end sides, said beam elements are arranged parallelly with at least one long side of one beam element facing a long side of another beam element, thereby forming a reactor support beam having a first and second opposing long side surface, a top surface and a lower surface.

15 Claims, 5 Drawing Sheets

Figure 1:
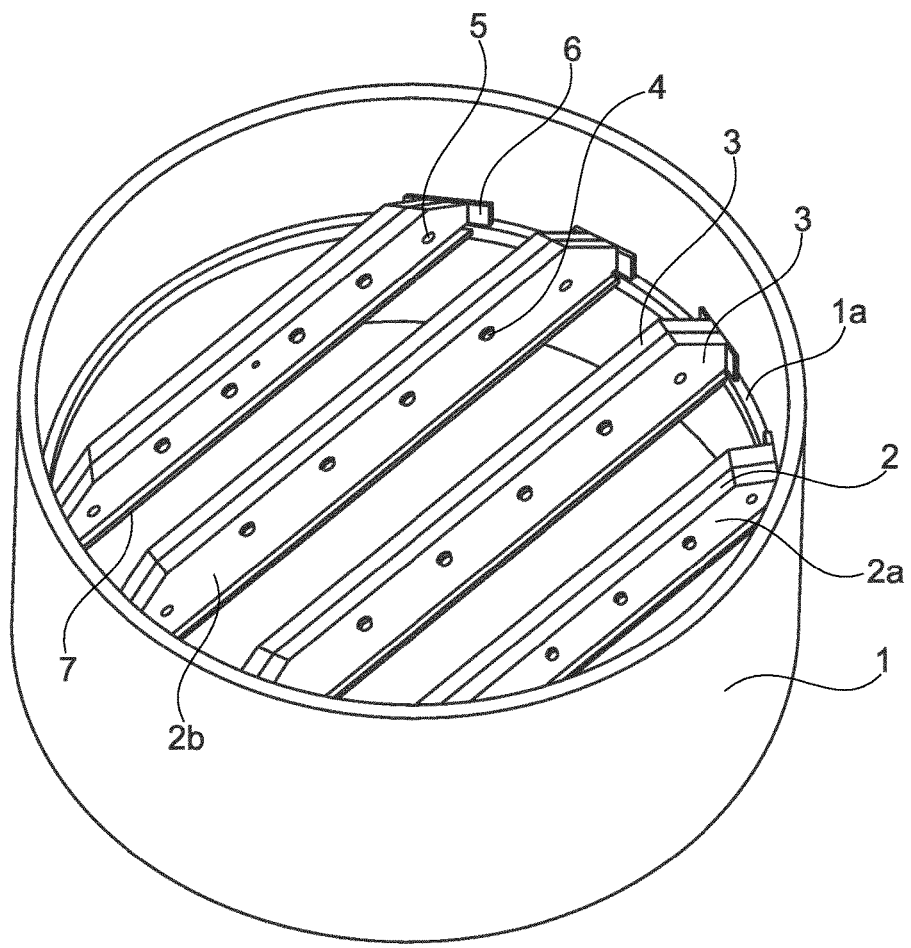

(51) Int. Cl.
  *B01J 19/30* (2006.01)
  *E04B 1/28* (2006.01)
  *E04C 3/07* (2006.01)
  *E04C 3/28* (2006.01)
  *E04C 3/29* (2006.01)

(52) U.S. Cl.
  CPC .................. *E04C 3/07* (2013.01); *E04C 3/28* (2013.01); *E04C 3/29* (2013.01); *B01J 2208/00884* (2013.01)

(58) Field of Classification Search
  CPC ............... B65D 90/16; F17C 2203/011; F17C 2203/014; F17C 2203/015
  USPC .................................. 220/651, 652, 653, 565
  See application file for complete search history.

(56) References Cited

U.S. PATENT DOCUMENTS

| | | | | |
|---|---|---|---|---|
| 4,993,095 A | * | 2/1991 | Lautensleger | E01D 2/04 14/13 |
| 5,510,061 A | * | 4/1996 | Moore | B01J 19/305 261/94 |
| 5,515,406 A | * | 5/1996 | Cowan, II | G21C 19/317 376/301 |
| 5,678,381 A | * | 10/1997 | DenAdel | E04C 3/29 52/836 |
| 5,756,048 A | * | 5/1998 | Zardi | B01J 8/008 422/311 |
| 5,916,529 A | * | 6/1999 | Scheuerman | B01J 8/003 208/148 |
| 5,966,894 A | * | 10/1999 | Crump, Jr. | E04C 3/29 52/404.3 |
| 6,061,995 A | * | 5/2000 | Menchetti | E04B 2/7411 52/481.1 |
| 6,881,387 B1 | * | 4/2005 | Jacobs | B01D 3/20 261/100 |
| 9,636,652 B2 | * | 5/2017 | Tammera | B01J 8/24 |
| 2005/0144892 A1 | * | 7/2005 | Strickland | B21D 47/01 52/837 |
| 2006/0236652 A1 | * | 10/2006 | Kismarton | B29C 65/562 52/782.1 |
| 2009/0092527 A1 | * | 4/2009 | Klinger | B01J 8/44 422/311 |
| 2010/0095611 A1 | | 4/2010 | Antonic | |
| 2011/0123404 A1 | * | 5/2011 | Rizzi | B01J 8/0285 422/148 |
| 2013/0312361 A1 | * | 11/2013 | Robinson | E04C 3/02 52/690 |
| 2015/0121802 A1 | * | 5/2015 | Veer | B32B 17/10045 52/854 |
| 2015/0217850 A1 | * | 8/2015 | Tien | B64C 1/064 428/121 |

FOREIGN PATENT DOCUMENTS

| | | | | |
|---|---|---|---|---|
| FR | 1521651 A | * | 4/1968 | ............ B65D 90/12 |
| GB | 414277 | | 8/1934 | |
| GB | 577547 | | 5/1946 | |
| GB | 813622 A | * | 5/1959 | ............ B65D 90/12 |
| WO | WO 97/26079 A1 | | 7/1997 | |

* cited by examiner

MULTIPLE ELEMENT SUPPORT BEAM

Catalyst support beams have a ubiquitous use in industrial processes, ranging from reactors to distillation and absorption columns. Often, for example in hydroprocessing reactors, they are massive structures with a thickness of 10-20 cm. The length and height vary with the vessel diameter and function of the support beams. Lengths up to at least 6 meters are seen in practice which results in heavy beams which are hard to handle and install.

The massive metal beams are manufactured by means of cutting metal plates. However, metal plates of the required thickness are not readily available as very few manufacturers supply them, which results in high prices and high delivery and manufacturing times.

The result is that the price and delivery time of a beam is not linearly dependent upon the thickness, the dependence is rather exponential.

In addition, for large vessels, the dimensions of the beam are such that steric hindrances give limitations to design and installation methods.

Thus there is a need for new designs for vessel support beams which reduce these disadvantages while providing at least the same structural stability and long term reliability as known solutions.

In a first aspect of the present invention is provided a support beam which is easier to handle during installation.

In a second aspect of the present invention is provided a support beam which presents less requirements to production process equipment and thus can have a faster delivery times and lower prices.

These and other advantages are provided by a vessel support beam comprising two or more beam elements wherein each beam element comprises a first and second opposing long side connected by a top side, a lower side and two opposing end sides, said beam elements are arranged parallelly with at least one long side of one beam element facing a long side of another beam element, thereby forming a reactor support beam having a first and second opposing long side surface, a top surface and a lower surface. Thus each support beam is constructed of at least two beam elements which each may have smaller dimensions than the traditional support beam. Due to the smaller size of the beam elements the production can be carried out by simpler means and a faster process rendering the production of the present support beam faster and potentially less costly compared to known beams.

Each support beam can comprise two, three or more beam elements. The beam elements may be of equal width or they may be of different width. For example the support beam may comprise two beam elements which are substantially symmetric and have the same width. Another example is a support beam comprising a central beam element of one type sandwiched by two beam elements of a second type. Thus the present support beam further enables simple but effective possibilities for designing highly specialized support beams comprising beam elements designed to optimize stability, dimensions, weight etc. in ways not possible in existing support beams. The applicant has shown that the support beams according to the present application fully satisfies requirements to lifetime, stability, safety and reliability which are key parameters in the field of vessel internals which field for the same reasons traditionally relies on well-known setups which has proven reliable over time.

The beam elements are placed adjacent to each other and the surfaces between two elements are preferably pressed against each other so that forces can be transferred from one to the other beam element.

Preferably the support beam comprises means for locking at least two of the beam elements together in order to keep them stabilized and fixed together when installed in the reactor.

For example the means for locking the beams together comprises through going holes in the beam elements and connecting means for passing through said through going holes. Such a setup with holes/through going means provides a simple but highly effective way of locking the beam elements together as the locking means can be used to fixate the elements in several dimensions as well as be used to pull the elements together if necessary.

In several embodiments the effective length of each of (or some) of the connecting means are longer than the distance between the first and second long side surface in an initial configuration of the reactor support beam. This means that the locking means may be arranged to allow for small changes in width, length and/or distance between the beam elements. Such changes in shape may be caused by the temperature changes during start-up and operation of the vessel/reactor. Small difference in deflections between the two beam elements may also be caused by uneven load distribution between the two beam elements.

Depending on the overall vessel setup the locking means may be evenly distributed across the beam elements or be arranged in specific areas of the beam. The locking means e.g. in form of through going holes can be arranged at least in the centre section of the long sides of the beam elements as this can be where the deflections of the beam elements can be most pronounced.

For example the locking means can be a bolt and nut setup, rivet or e.g. clamping means. The locking means may be of a single type or of different types used in combination.

One or more of the beam elements may comprise means for fastening to and/or supporting in a vessel in order to arrange the support beam in the vessel. For example the beam elements can comprise means for supporting the support beam on a vessel support ring. The support beam may be mechanically fixed and/or alternatively simply rest on one or more structures such as the vessel support ring.

The beam elements constituting a support beam may be of the same or different types. At least one of the beam elements can be massive. Massive beam elements may provide a high degree of stability to the support beam as well as they may be simple to manufacture. In combination with or alternative to massive beam elements, beam elements may have one or more sections with reduced material density or thickness. Such beam elements with varying density and/or thickness may provide a high degree of stability while adding less mass to the support beam.

In some setups the top sides of the beam elements together form a vessel support beam top surface. Similarly lower sides of the beam elements together form a vessel support beam lower surface. The top sides of the beam elements may be flush or they may be in different levels or form an at least partly sloping support beam top surface. Similarly the lower support beam surfaces may form a flat support beam lower surface or a stepped or at least partly sloping lower surface.

The support beam may comprise cover means for covering at least part of the vessel support beam top surface and/or at least part of other surfaces. The cover means has the function to prevent catalyst particles and debris to get stuck between two adjacent beam elements and thus exercise a separating force between two adjacent beam elements.

The material of the support beam may be selected based on temperature and environment. For non-corrosive environment low-alloy or even CS can be chosen. For corrosive environment stainless steel grades are typically used but also more noble materials can be used.

For some cases it can be beneficial to use a CS/low alloy base material as stress bearing part and use a cladding by mean of weld-overlay or metal sheet cover which will protect the base material from the hazardous environment. In case of the metal sheet cover it could be made as with a final cover which is seal-welded during installation on the top and bottom of the beam assembly.

The support beam may form part of a catalyst support system arranged to hold various types of catalyst supports. I.e. the support beams may form together with support grids or cover panels of other means a support structure for one or more catalyst beds.

Typical Temperature range during working conditions in a vessel such as a reactor can go from 200° up to 500° C., such as below 460°. In some applications the standard working range may be 250-454° C. In some embodiments for example in some cases of absorption, the temperature may be lower than the above temperature intervals, such as around Room temperature, down to 0° C., or even down temperatures relevant for processes including liquid nitrogen i.e. temperatures in the lower range may be from 0--200° C.

The dimension of a support beam can range from 1 to 10 meter in length, such as 2-6 m in length, 2 to 40 cm in thickness, such as 10-30 cm° in thickness, and/or between 10 to 100 cm in height such as 20-70 cm in height, but not limited to this.

The design load for the catalyst support system can range from 2 to 15 bar, but is not limited to this.

The support beams may be arranged to carry a heavy load. The support beams may for example carry the weight of one or more catalyst support modules or similar structures, each modules for example weighing 100-500 kg. Each beam may carry the weight of 1, 2, 3, 4, 5, up to 10, 12 or more of such modules. I.e. the present support beam may for example be arranged to each support from a one or a few hundred kilos to several tons, such as from 300-4000 kg. Thus the present support beams are of a kind which often must carry a high and in some setups uneven weight load. Also the beams may be installed in a vessel with an aggressive environment (depending on the composition and/or pressure of the reactants and/or atmosphere in the vessel). Furthermore the present beams may often be used in vessels wherein the temperature may be varied and/or wherein the temperature may be elevated to high temperatures for prolonged periods of time.

In some embodiments of the invention, mounting or demounting of the support beam or parts of the support beams elements may be performed without any tools. This may be accomplished if the fixing means for fixing is a quick release. By quick release is understood a fixing means which can fix a plate element to the base elements or to other plate elements, or to both a plate elements and the base elements without using tools or at least only using simple tools and without using much time. The quick release elements may be specially designed for the application in question. The quick release may for instance be in the form of a knee joint element, an eccentric, a wedge element, a screw and nut element, a screw and wing nut element or any of the mentioned elements in combination with a keyhole and bolt element. The quick release elements may be equipped with lever.

Parts such as end zones of the support beams and/or beam elements may be truncated or rounded in order to achieve a beam/element which can be handled in a confined space such as inside a reactor or other type of vessel.

The present support beam may be completely or partly assembled before installation in the vessel. Alternatively the various parts of the support beam may be assembled inside the vessel whereby the present invention allows the assembly and installation of support beams in vessels which are not practically and/or easily accessible to traditional beams.

One or more of the present support beam may be arranged for example in reactors, distillation or absorption towers, or other types of equipment. The reactor may for example be a hydroprocessing reactor, a methanol or ammonia reactor. Support beams are ubiquitous in industrial processes. For example they are used in distillation or absorption towers, in various processes, such as in refineries, $CO_2$ absorption, methanol absorption, etc.

In the following the invention is further described with reference to the accompanying drawings. The drawings are examples illustrating some but not all features and embodiments of the present support beam and are not to be construed to be limiting to the invention.

FIG. 1 shows a reactor section 1 arranged with four support beams 2. The reactor section has a roundgoing reactor support ring 1a (please note that it could also be resting on support brackets instead of a heavy support ring) on the inner surface on which the support beams are resting. Two support beams 2a are arranged to be fixed off centre in the reactor and two support beams 2b are arranged to be fixed in the centre region of the reactor. Each support beam comprises two beam elements 3 and locking means 4 in form of a bolt and nut system. Each support beam/element also comprises means for lifting 5 the assembled beam and/or individual beam element. In the present example these means for lifting are simple through going holes, but could also e.g. be loops. Each beam element is arranged with means for supporting in relation to the reactor in form of a protruding section 6 in each end of the beam element. The support beams 2 are arranged to support a number of catalyst grids (not shown) by a long going low shoulder 7 arranged near the lower surface of the support beams.

Figure 2:
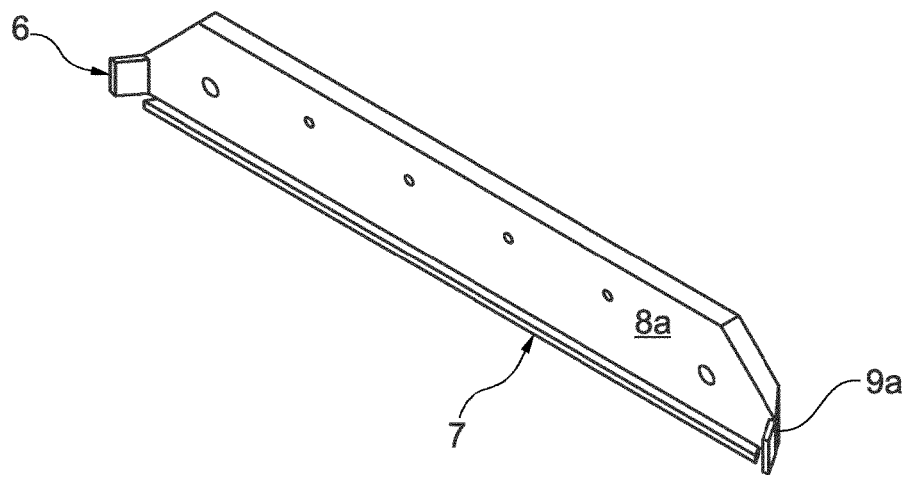

FIG. 2 shows a beam element 3 arranged to form part of a support beam arranged off centre in the reactor. The beam element 3 is arranged to form a support beam together with at least one, two or more other beam elements of similar or different type. In the present setup the intended position in the reactor results in that the protruding flaps 6 has an angle of more than 90 deg with respect to the long side 8a having the shoulder 7. Similarly the end side 9 is angled in order for the protruding flap and end side to best possibly follow the curvature of the inner reactor wall (not shown) and rest on the reactor support ring. In the present example part of the end zones 15 of the beam element are truncated as this makes the beam element and/or assembled support beam easier to handle e.g. easier turn around inside a defined space such as a reactor.

Figure 3:
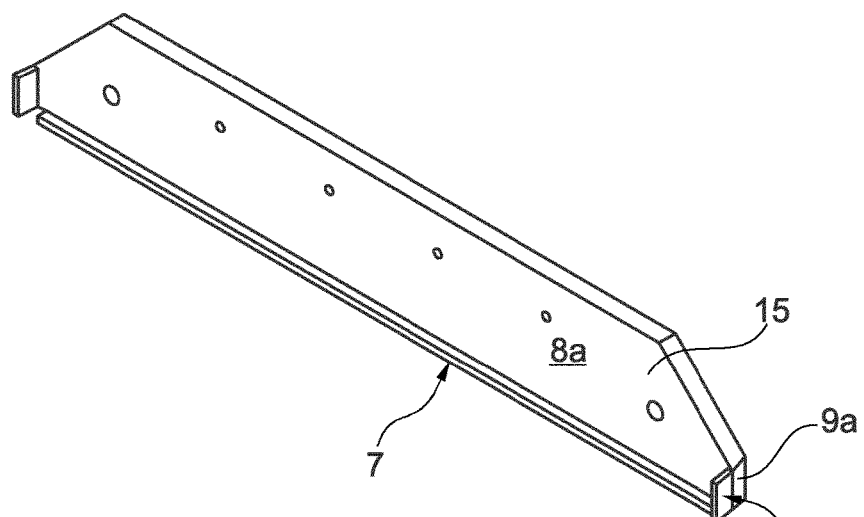

FIG. 3 shows a beam element 3 arranged to form part of a support beam fixed in the centre region of the reactor. In the present setup the intended position in the reactor results in that the protruding flaps 6 has an angle of approximately 90 deg with respect to the long side 8a having the lower shoulder 7. Similarly the end side 9 is only slightly angled in order for the protruding flap and end surface 9 to best possibly follow the curvature of the inner reactor wall (not shown).

Figure 4A:
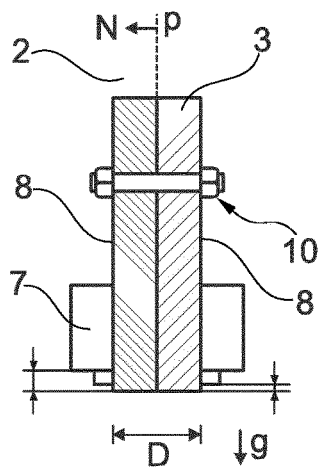
Figure 4B:
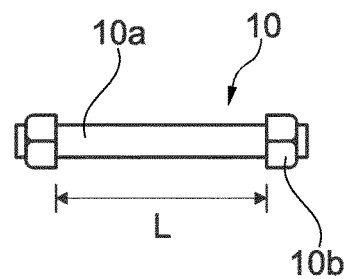

FIG. 4a shows a cross section of a support beam 2 having two beam elements 3 and a though going locking means 10 in form of a simple bolt 10a and nut 10b. The distance between the first and second long side surface 8 is indicated by D. FIG. 4b shows how the effective length L of the locking means is defined.

The two beam elements are arranged parallelly with one long side of one beam element facing a long side of the other beam element thereby defining a contact plane P.

The surface normal N of one, two or more contact planes P in a support beam according to the present application is preferably perpendicular or at least substantially perpendicular to the gravity indicated by arrow g when arranged in a vessel such as a reactor.

Figure 5:
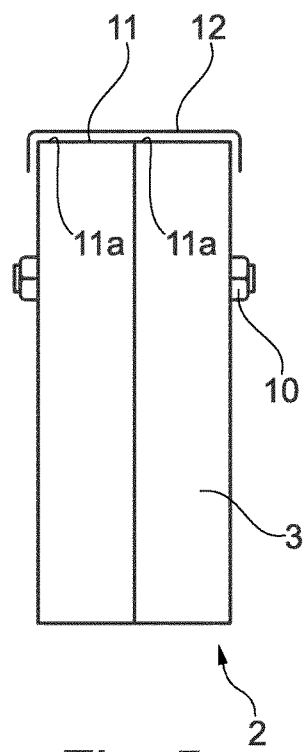

FIG. 5 shows a support beam 2 having two beam elements 3 each having a top side 11a which together form a support beam top surface 11. The top surface 11 is covered by a simple cover 12 in form of a bend metal sheet.

Figure 6:
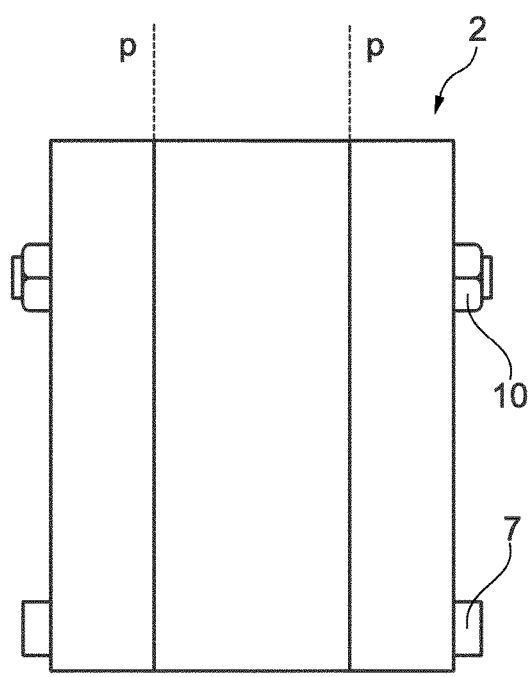

FIG. 6 shows an embodiment of a support beam comprising three beam elements of a first 3a and second 3b type. The second type here being thicker than the first type.

Figure 7A:
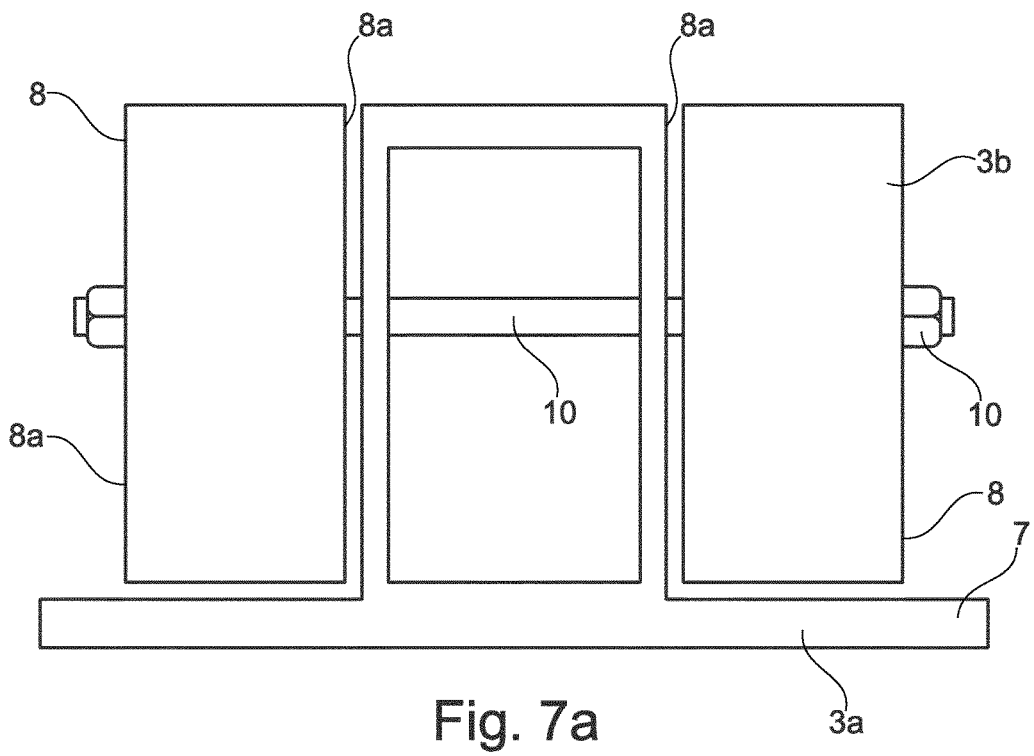
Figure 7B:
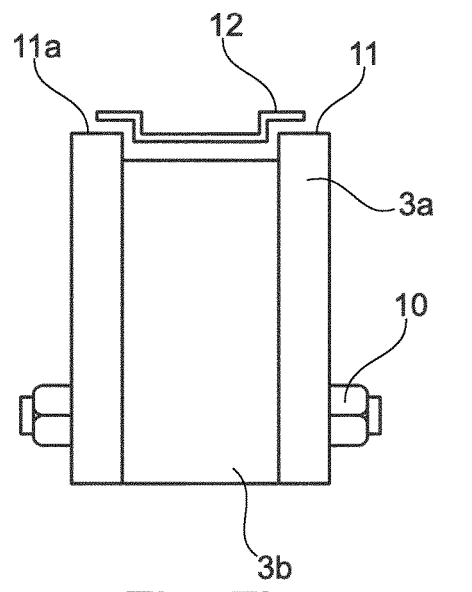
Figure 7C:
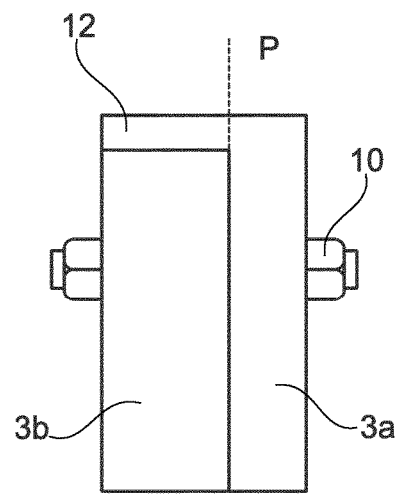

FIGS. 7a-7c shows three exemplary setups of support beams. FIG. 7a shows a slightly exploded view of an embodiment with a partly hollow centre beam element 3a. FIG. 7b shows a support beam where the top sides of the beam elements are not in the same level forming a stepped support beam top surface 11. Fig. c shows an embodiment with not identical first 3a and second 3b beam element, wherein the cover 12 is an integrated part of the first beam element 3a.

Figure 8:
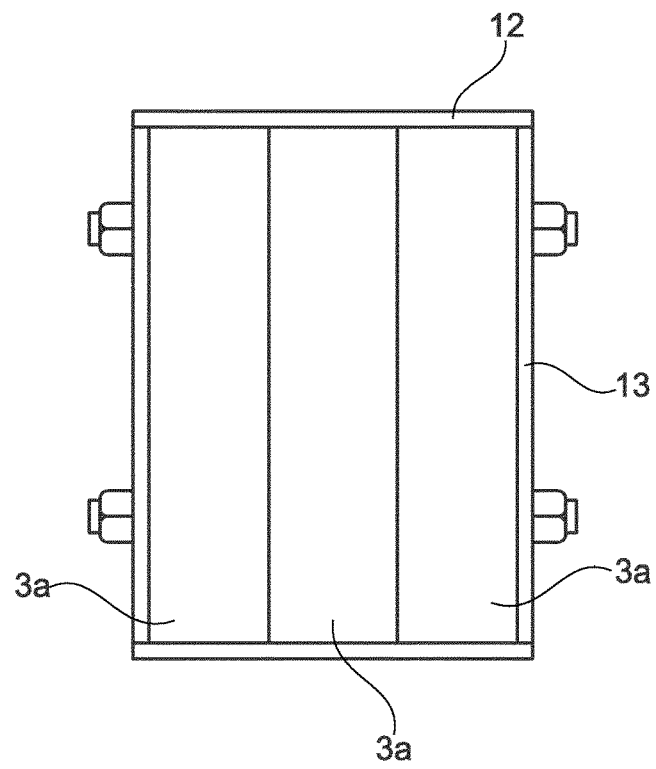

FIG. 8 shows how one type of beam element is used as base material/stress bearing part onto which a cladding 13 in form of an weld-overlay or metal sheet cover which will protect the base material from the hazardous environment is added. In case of the metal sheet cover it could be made as with a final cover 12 which is seal-welded during installation on the top and bottom of the beam assembly. The cladding can be the same on all four surfaces, may cover only one or more surfaces or alternatively one or more surfaces may be covered by a metal sheet cover while one or more surfaces are covered by a weld overlay.

Figure 9:
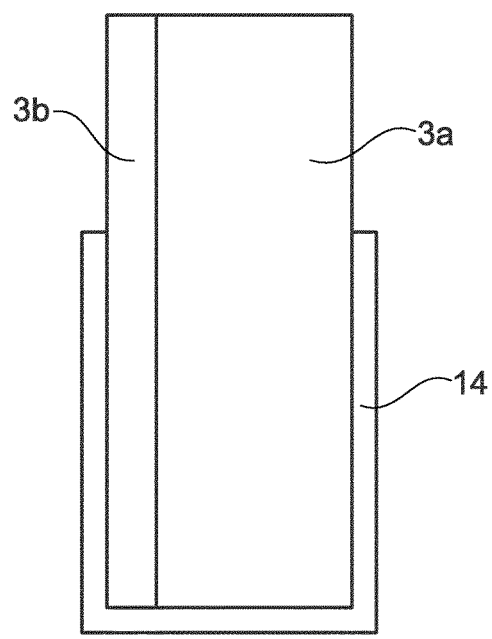

FIG. 9 shows how two beam elements are arranged in a U shaped clamp 14. One or more U shaped clamps may be arranged at one or more points along the length of the support beam, for example the U clamps can be arranged at or near the reactor wall to support the support beam. The U shaped clamp may additionally or alternatively be used as locking means holding the beam elements together. In case the U shaped clamp forms part of support means supporting the beam elements e.g. near the beam wall the U clamp may be used to assist the assembly of the support beam as the beam elements may be slid into the U clamp one by one thereby both holding the beams elements together and supporting them from below. The U clamp(s) may be releasable or permanently attached to the support beam, reactor wall and/or reactor support ring etc.

The invention claimed is:

1. A support beam configured to be installed inside a vessel comprising two or more longitudinal beam elements wherein each beam element comprises a first and second opposing long side connected by a top side, a lower side and two opposing end sides, said lower side having a width greater in dimension than said top side to form a bottom shoulder, said beam elements are arranged in parallel with at least one long side of one beam element facing a long side of another beam element, thereby forming the vessel support beam having a first and second opposing long side surface, a top surface and a lower surface, wherein each of said beam elements includes holes extending through the opposing long sides, such that holes of one beam element align with corresponding holes of an adjacent beam element, said support beam further comprising connecting means for locking the beam elements together, and wherein said bottom shoulder is adapted to support a number of catalyst grids, the beam further comprising protruding flaps configured to follow a curvature of an inner vessel wall.

2. The support beam according to claim 1, wherein said vessel is one of a reactor, distillation and an absorption tower, and wherein the reactor is one of a hydroprocessing reactor, a methanol reactor and an ammonia reactor.

3. The support beam according to claim 1, wherein at least two beam elements are arranged parallelly with one long side of one beam element facing a long side of the other beam element thereby defining a contact plane P and where the surface normal N of the contact plane P is at least substantially perpendicular to the gravity g.

4. The support beam according to claim 1, wherein one or more of the beam elements further comprises means for fastening and/or supporting the support beam and/or beam element in a vessel.

5. The support beam according to claim 1, wherein one or more of the beam elements comprises one or more sections with reduced material thickness or density.

6. The support beam according to claim 1, wherein the top sides of the beam elements together form a reactor support beam top surface.

7. The support beam according to claim 6, comprising cover means for covering at least part of the reactor support beam top surface.

8. The support beam according to claim 1, wherein the connecting means is at least one of a U-clamp and a bolt, wherein the bolt extends through the holes.

9. The support beam according to claim 1, wherein the connecting means is a U-clamp arranged to support a support beam in a vessel.

10. The support beam according to claim 1, wherein the connecting means for locking the beam elements together are arranged in at least one of a center section and end zones of the long sides of the beam elements.

11. The support beam according to claim 1, wherein the effective length of some or each of the connecting means are longer than the distance between the first and second long side surface in an initial configuration of the reactor support beam.

12. The support beam according to claim 1, wherein the support beam is made of one or more metals.

13. The support beam according to claim 1, wherein the one or more beam elements has one or more truncated zones.

14. A vessel comprising at least one support beam according to claim 1.

15. The vessel according to claim 14 wherein said vessel is one of a reactor, distillation and absorption tower, and the reactor is one of a hydroprocessing reactor, a methanol reactor and an ammonia reactor.

* * * * *